(12) United States Patent
Reitnouer

(10) Patent No.: US 8,888,135 B1
(45) Date of Patent: Nov. 18, 2014

(54) CLAMP ATTACHMENT OF SUSPENSION HANGER TO ALUMINUM FLATBED FRAME

(71) Applicant: Miles A. Reitnouer, Leesport, PA (US)

(72) Inventor: Miles A. Reitnouer, Leesport, PA (US)

( * ) Notice: Subject to any disclaimer, the term of this patent is extended or adjusted under 35 U.S.C. 154(b) by 0 days.

(21) Appl. No.: 13/926,425

(22) Filed: Jun. 25, 2013

(51) Int. Cl.
*B62D 21/11* (2006.01)
*B60G 99/00* (2010.01)

(52) U.S. Cl.
CPC ............ *B60G 99/00* (2013.01); *B62D 21/11* (2013.01); *B60G 2206/604* (2013.01); *B60G 2206/601* (2013.01)
USPC ............................ 280/788; 280/799; 280/781

(58) Field of Classification Search
CPC .................. B60G 2206/604; B60G 2206/601; B62D 21/11
USPC .......................................... 280/788, 781, 799
See application file for complete search history.

(56) References Cited

U.S. PATENT DOCUMENTS

| | | | | | |
|---|---|---|---|---|---|
| 1,652,695 | A | * | 12/1927 | Barber | 248/72 |
| 1,662,539 | A | * | 3/1928 | Schmidt | 104/111 |
| 1,846,178 | A | * | 2/1932 | Bergren | 104/111 |
| 1,962,497 | A | | 6/1934 | Francis | |
| 2,345,650 | A | * | 4/1944 | Attwood | 403/21 |
| 2,617,346 | A | * | 11/1952 | Jeoffroy | 172/681 |
| 2,657,643 | A | * | 11/1953 | Swanback et al. | 104/99 |
| 2,674,429 | A | * | 4/1954 | Webster | 248/235 |
| 3,197,228 | A | | 7/1965 | Felburn | |
| 3,392,988 | A | * | 7/1968 | Marinelli | 280/781 |
| 3,580,611 | A | * | 5/1971 | McNitt | 280/433 |
| 3,929,078 | A | * | 12/1975 | Sears | 104/111 |
| 4,166,640 | A | | 9/1979 | Van Denberg | |
| 4,534,589 | A | | 8/1985 | Booher | |
| 4,789,181 | A | | 12/1988 | Baxter | |
| 4,906,021 | A | | 3/1990 | Rowe et al. | |
| 4,991,872 | A | * | 2/1991 | Richardson | 280/788 |
| 5,085,025 | A | | 2/1992 | Gaddis | |
| 5,205,587 | A | | 4/1993 | Orr | |
| 5,265,690 | A | * | 11/1993 | Amundsen et al. | 180/89.1 |
| 5,366,237 | A | | 11/1994 | Dilling et al. | |
| 5,509,688 | A | * | 4/1996 | Tingstad | 280/789 |
| 5,549,049 | A | * | 8/1996 | Deandrea | 104/111 |
| 5,558,369 | A | * | 9/1996 | Cornea et al. | 280/800 |
| 5,649,719 | A | | 7/1997 | Wallace et al. | |
| 5,775,711 | A | * | 7/1998 | Floe | 280/405.1 |
| 5,845,919 | A | | 12/1998 | VanDenberg | |
| 6,047,989 | A | * | 4/2000 | Wood | 280/789 |
| 6,302,238 | B1 | * | 10/2001 | Preusser et al. | 182/150 |
| 6,916,037 | B2 | | 7/2005 | Baxter et al. | |
| 7,059,819 | B2 | * | 6/2006 | Brackmann et al. | 414/462 |
| 7,350,795 | B2 | | 4/2008 | Svartz et al. | |
| 7,600,785 | B2 | * | 10/2009 | Ramsey | 280/781 |
| 8,235,422 | B2 | * | 8/2012 | Carr et al. | 280/788 |

(Continued)

*Primary Examiner* — Nicole Verley
(74) *Attorney, Agent, or Firm* — Caesar, Rivise, Bernstein, Cohen & Pokotilow, Ltd.

(57) ABSTRACT

A flatbed trailer design that uses clamps, or a clamp and an L-bracket, to secure aluminum main beams to their respective suspension hangers without penetrating the lower flange portion of the main beams. Where the main beams are I-shaped, a clamp secures a part of the lower flange portion on each side of the main beam web to a support plate that is welded to the suspension hanger. Where the main beams are L-shaped, a clamp secures a part of the lower flange portion to the support plate that is welded to the suspension hanger; an L-bracket is then used on the other side of the L-shaped main beam to secure the main beam web to the support plate.

13 Claims, 5 Drawing Sheets

(56) References Cited

U.S. PATENT DOCUMENTS

| | | |
|---|---|---|
| 8,371,596 B2 * | 2/2013 | Johnson et al. ........ 280/124.116 |
| 8,496,259 B2 * | 7/2013 | Ramsey ...................... 280/149.2 |
| 8,500,154 B2 * | 8/2013 | Nangle ......................... 280/656 |
| 8,517,423 B1 * | 8/2013 | Huston et al. ................. 280/785 |
| 8,690,189 B2 * | 4/2014 | Huston et al. ................. 280/785 |
| 2003/0123965 A1 * | 7/2003 | Brackmann et al. .......... 414/467 |
| 2005/0036847 A1 * | 2/2005 | Brackmann et al. ............ 410/2 |
| 2005/0275208 A1 * | 12/2005 | Few et al. ..................... 280/788 |
| 2007/0252373 A1 * | 11/2007 | Rogers ......................... 280/781 |
| 2008/0231034 A1 * | 9/2008 | Carr et al. .................... 280/789 |

* cited by examiner

US 8,888,135 B1

CLAMP ATTACHMENT OF SUSPENSION HANGER TO ALUMINUM FLATBED FRAME

BACKGROUND OF THE INVENTION

1. Field of Invention

The present invention relates to a flatbed trailers and box-type truck structures (e.g., vans, container chassis, etc.) and, in particular, the invention pertains to an improved attachment of suspension hangers to aluminum flatbed frames.

2. Description of Related Art

The main bearing members for loads placed on flatbed trailers are a pair of I-beams, generally known as the "main beams" which run longitudinally the length of the bed. Properly fabricated, the beams are flexed or curved vertically upward and designed to compress or straighten longitudinally under load. Coupling of the wheel axles to the main beams is typically achieved via "suspension hangers" on each side of the flatbed which are connected together by a cross member.

Where these main beams are steel, the lower flange portion of the main beams can be welded to the suspension hangers. However, where the main beams comprise aluminum, the lower flanges thereof cannot be welded to the suspension hangers; instead, they are bolted to the suspension hangers through the lower flange portions, as shown in FIG. 1. In particular, a support plate 2 is welded to its corresponding suspension hanger 4. A cross beam 6 is welded to the suspension hangers at each end. The lower flange portion 7 of each aluminum main beam 8 is then bolted 10 to the support plate 2. The problem, though, with bolting the suspension hangers 4 through the lower flange portions 7 is that holes are created in the highly-stressed lower flange portions 7. This weakens and adds stress to the lower flange portion 7 which can cause premature failure in this area.

The following U.S. patents are related to the field of flatbeds or trucks, including their respective main beam/suspension assemblies: U.S. Pat. No. 1,962,497 (Francis); U.S. Pat. No. 3,197,228 (Felburn); U.S. Pat. No. 4,166,640 (Van Denberg); U.S. Pat. No. 4,534,589 (Booher); U.S. Pat. No. 4,789,181 (Baxter); U.S. Pat. No. 4,906,021 (Rowe, et al.); U.S. Pat. No. 5,085,025 (Gaddis); U.S. Pat. No. 5,205,587 (Orr); U.S. Pat. No. 5,366,237 (Dilling, et al.); U.S. Pat. No. 5,558,369 (Cornea, et al.); U.S. Pat. No. 5,649,719 (Wallace, et al.); U.S. Pat. No. 5,845,919 (VanDenberg); U.S. Pat. No. 6,916,037 (Baxter, et al.); and U.S. Pat. No. 7,350,795 (Svartz, et al.).

Thus, there remains a need for a device and method for securing the suspension hangers to the aluminum main beams without penetrating the lower flange portions of the main beams.

All references cited herein are incorporated herein by reference in their entireties.

BRIEF SUMMARY OF THE INVENTION

A clamp for securing a suspension hanger to a lower flange of an aluminum main beam (e.g., an I-shaped main beam, an L-shaped main beam, etc.) of a flatbed truck is disclosed. The suspension hanger includes a support plate secured thereto. The clamp comprises: an elongated body having a plurality of apertures therein and a longitudinal axis; a portion along a top edge of the elongated body forms an extension outward from the body and is aligned with the longitudinal axis, wherein the extension engages a portion of the lower flange of the aluminum main beam; and a plurality of couplings, corresponding to the plurality of apertures, that are used to secure the clamp to the support plate.

A flatbed truck having suspension hangers that are secured to respective aluminum main beams is disclosed. The flatbed truck comprises: at least two aluminum main beams (e.g., I-shaped main beams, an L-shaped main beams, etc.); at least two suspension hangers each having a respective support plate; and at least one clamp for each of the at least two suspension hangers that secures a portion of a lower flange of each of the at least two aluminum main beams to a respective one of the at least two suspension hangers without penetrating the portion of the lower flange.

A method for securing a suspension hanger to a lower flange of an aluminum main beam of a flatbed truck without penetrating the lower flange of the aluminum main beam is disclosed. The method comprises: providing at least two aluminum main beams (e.g., I-shaped main beams, an L-shaped main beams, etc.); providing at least two suspension hangers each having a respective support plate; and clamping a portion of a lower flange of each of the at least two aluminum main beams to a respective one of the at least two suspension hangers without penetrating the portion of the lower flange.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 2:
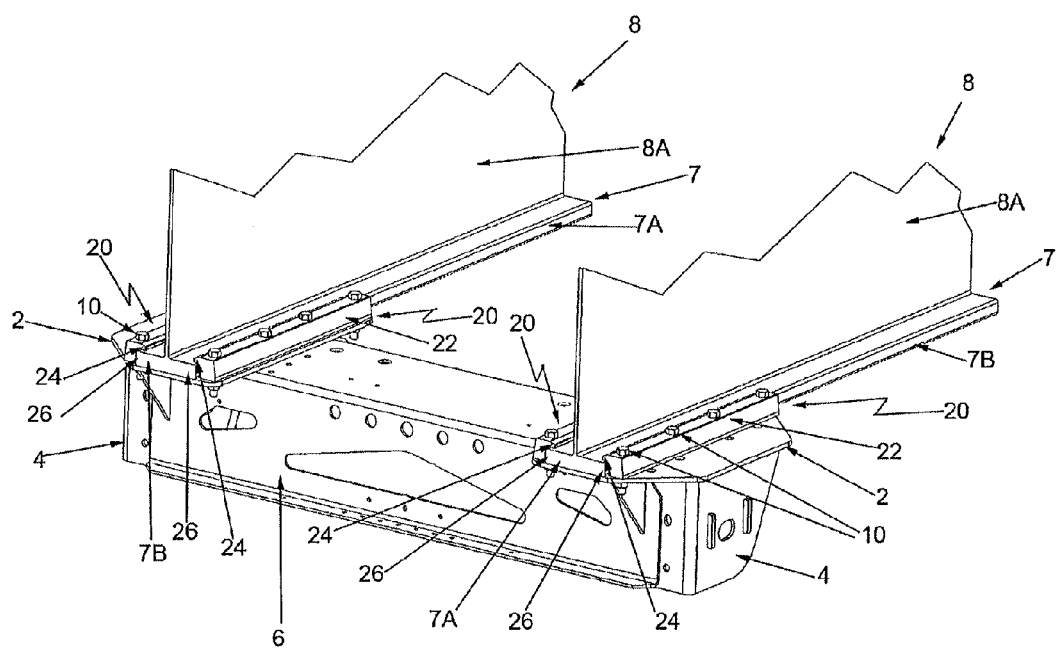
FIG. 2 is an isometric view of an exemplary flatbed truck using the clamps of the present invention depicting how the clamps secure the aluminum main beams, shown partially, to their corresponding suspension hangers without penetrating the lower flange of the main beams.
Figure 2A:
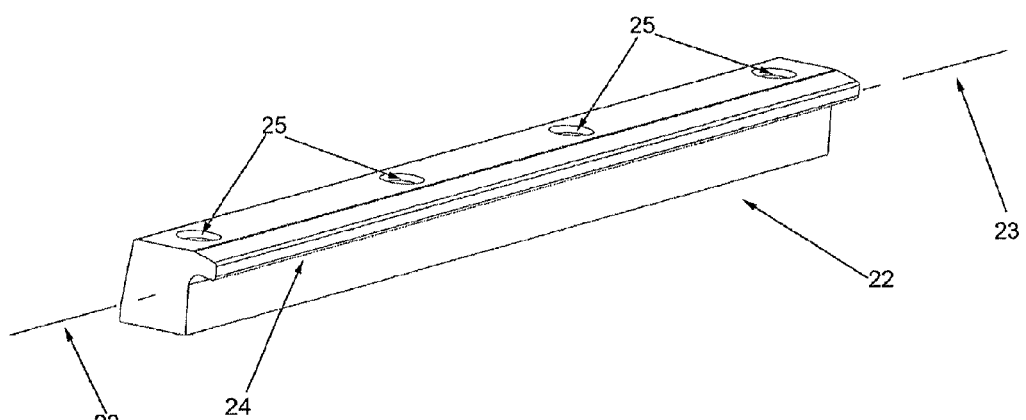
FIG. 2A is an isometric view of the clamp body of the present invention with the couplings omitted.

There is shown in FIG. 2, the clamp 20 of the present invention used to secure suspension hangers 4 to respective aluminum main beams 8 (e.g., I-shaped) of a flatbed truck without penetrating the lower flange 7 (comprising an inner foot 7A and an outer foot 7B with respect to a main beam web 8A) of the main beams 8. In particular, clamp 20 comprises an elongated member 22 having a longitudinal axis 23 (see FIG. 2A) and includes a lip or extension 24 (aligned with the longitudinal axis 23) under which is trapped a portion 26 of the lower flange 7 of the main beams 8. The elongated member 22 comprises a plurality of apertures 25 (FIG. 2A) for receiving couplings 10 (e.g., bolt/nut, screw/nut, nails, rivets, pins, or any equivalent coupling means and including washers) therethrough which secure the clamp 20 to a support plate 2 that is, in turn, fixed (e.g., welded, etc.) to it corresponding suspension hanger 4. With the portion 26 of the lower flange inner foot 7A and outer foot 7B trapped under the lip/extension 24 of its respective clamp 20, each aluminum main beam 8 is tightly secured to its respective suspension hanger 4.

Figure 3:
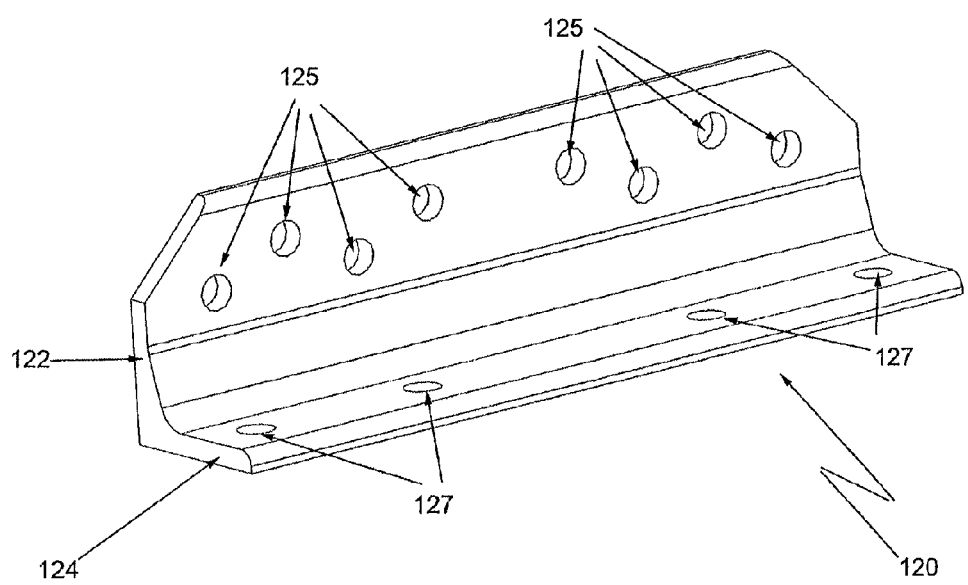
FIG. 3 is an isometric view of the L-bracket of the present invention with the couplings omitted.
Figure 3A:
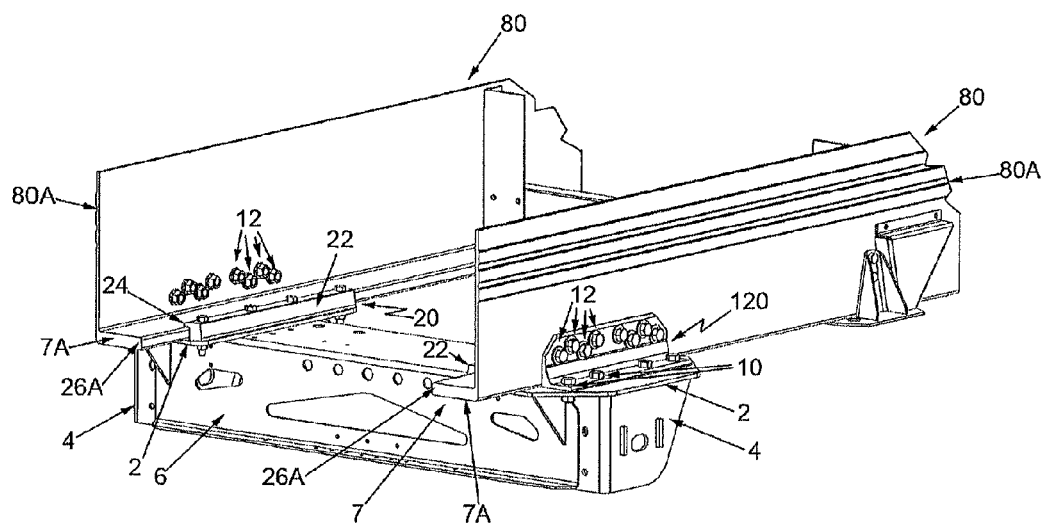
FIG. 3A is an isometric view of an exemplary flatbed using the clamps and L-brackets for securing "L-shaped" aluminum main beams, shown partially, to their respective suspension hangers also without penetrating the lower flange of the main beams.

Since there is no penetration of the lower flange inner foot 7A or outer foot 7B on either side of the web 8A of each main beam 8, this eliminates or reduces another source of stress that can weaken and thereby cause premature failure in that area of the flatbed structure. The clamp 20 may comprise an aluminum material.

Where the aluminum main beams are "L-shaped" 80 rather than "I-shaped 8, the clamp 20 is used in conjunction with a bracket 120 (e.g., "L-bracket"), as shown in FIG. 3. As shown most clearly in FIG. 3A, clamps 20 are used to secure a portion 26A of the lower flange inner foot 7A of the L-shaped aluminum main beams 80. To provide support to the outer-facing surface of the main beams 80, brackets 120 (only one of which can be seen in FIG. 3A) are attached to the web portion 80A of the main beams 80 via couplings 12 (e.g., bolt/nut, screw/nut, nails, rivets, pins, or any equivalent coupling means, including washers). In particular, the bracket 120 has a first portion 122 that is secured to the support plate 2 via several couplings 10 (e.g., bolt/nut, screw/nut, nails, rivets, pins, or any equivalent coupling means) that pass through apertures 125 (FIG. 3), and has a second portion 124 that is secured to the web portion 80A via several couplings 12 that pass through apertures 127 (FIG. 3). The bracket 120 may comprise an aluminum material or a steel material.

Figure 1:
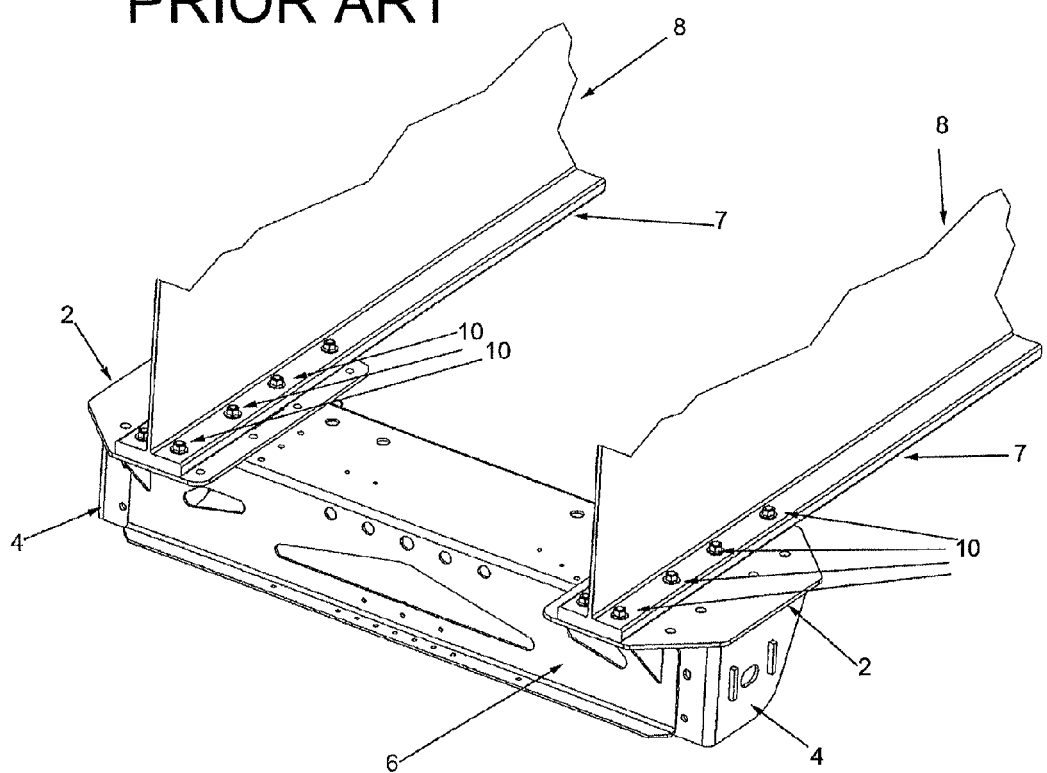
FIG. 1 is an isometric view of a prior art flatbed truck that uses aluminum main beams, shown partially, that are bolted at their respective lower flanges to support plates of the respective suspension hangers.

The term "penetrating" as used throughout this Specification implies the complete passage through the lower flange, as exemplified by the bolts 10 shown in FIG. 1 that completely pass through the lower flange 7 into the support plate 2. Thus, the engagement or gripping of the clamp's extension 24 against the portion of the lower flange 7A or 7B shown in FIGS. 2-3 when the couplings 10/12 are tightened or otherwise loaded is not considered "penetrating" the lower flange 7A or 7B even though that extension 24 may pierce, perforate or otherwise cause an indentation in the lower flange 7A/7B but does not pass completely through it.

It should be noted that penetration of the web portion 80A by the couplings 12, do not weaken or cause premature failure in the location of the lower flange inner foot 7A of the main beams 80.

While the invention has been described in detail and with reference to specific examples thereof, it will be apparent to one skilled in the art that various changes and modifications can be made therein without departing from the spirit and scope thereof.

Although terms such as "up," "down," "left," "right," "front," "rear," "side," "top," "bottom," "forward," "rearward," "inner," "outer," "above," "under" and/or "over," and the like may be used herein as a convenience in describing one or more embodiments and/or uses of the present arrangement, the articles described may be positioned in any desired orientation and/or may be utilized in any desired position and/or orientation. Such terms of position and/or orientation should be understood as being for convenience only, and not as limiting of the invention as claimed.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:

1. A clamp for securing a suspension hanger to a lower flange of an aluminum main beam of a flatbed truck, the suspension hanger including a support plate secured thereto, said clamp comprising:
    an elongated body having a plurality of apertures therein and a longitudinal axis;
    a portion along a top edge of said elongated body that forms an extension outward from said body and aligned with said longitudinal axis, said extension engaging a portion of the lower flange of the aluminum main beam; and
    a plurality of couplings, corresponding to said plurality of apertures, that are used to secure said clamp to said support plate.

2. The clamp of claim 1 wherein each one of said plurality of couplings comprises a bolt and nut pair.

3. A flatbed truck having suspension hangers that are secured to respective aluminum main beams, said flatbed truck comprising:
    at least two aluminum main beams;
    at least two suspension hangers each having a respective support plate; and
    at least one clamp for each of said at least two suspension hangers that secures a portion of a lower flange of each of said at least two aluminum main beams to a respective one of said at least two suspension hangers without penetrating said portion of said lower flange.

4. The flatbed truck of claim 3 wherein said at least one clamp comprises:
    an elongated body having a plurality of apertures therein and a longitudinal axis;
    a portion along a top edge of said elongated body that forms an extension outward from said body and aligned with said longitudinal axis, said extension engaging said portion of the lower flange of the aluminum main beam; and
    a plurality of couplings, corresponding to said plurality of apertures, that are used to secure said clamp to said respective support plate.

5. The flatbed truck of claim 4 wherein said at least two aluminum main beams comprise I-shaped beams, said lower flange of each I-beam comprising a first foot and a second foot and wherein said at least one clamp comprises respective clamps that secure respective portions of said first foot and said second foot to a common support plate without penetrating either said first foot or said second foot.

6. The flatbed truck of claim 4 wherein said at least two aluminum main beams comprise L-shaped beams, said flatbed truck further comprising a respective bracket and a plurality of couplings, located on a side of said L-shaped beam, opposite the location of said at least one clamp, said respective bracket and said plurality of couplings securing a portion of a web of said L-shaped beam to said support plate to which said at least one clamp is secured.

7. The flatbed truck of claim 6 wherein said respective bracket comprises an L-bracket.

8. The flatbed truck of claim 6 wherein each one of said plurality of couplings comprises a bolt and nut pair.

9. The flatbed truck of claim 4 wherein each one of said plurality of couplings comprises a bolt and nut pair.

10. A method for securing a suspension hanger to a lower flange of an aluminum main beam of a flatbed truck without penetrating the lower flange of the aluminum main beam, said method comprising:
    providing at least two aluminum main beams;
    providing at least two suspension hangers each having a respective support plate; and
    clamping a portion of a lower flange of each of said at least two aluminum main beams to a respective one of said at least two suspension hangers without penetrating said portion of said lower flange.

11. The method of claim 10 wherein said step of clamping a portion of a lower flange of each of said at least two aluminum main beams comprises:

securing a support plate to each of said at least two suspension hangers;

providing a clamp having an elongated body including a plurality of apertures therein and a longitudinal axis and further comprising a portion along a top edge of said elongated body that forms an extension outward from said body and aligned with said longitudinal axis;

engaging said portion of the lower flange of the aluminum main beam with said extension; and securing a plurality of couplings through said corresponding plurality of apertures and through said support plate.

12. The method of claim 11 wherein each of said at least two aluminum main beams is L-shaped and wherein said method further comprises securing a bracket to a web portion of each of said at least two aluminum main beams to a respective support plate, said bracket being located on a side of said at least two aluminum main beams that is opposite the location of said clamp.

13. The method of claim 12 wherein said bracket is an L-bracket.

\* \* \* \* \*